United States Patent [19]

Bauer et al.

[11] Patent Number: 4,799,551
[45] Date of Patent: Jan. 24, 1989

[54] ENHANCED OIL RECOVERY

[75] Inventors: Sándorné Bauer, Nagykanizsa; Zoltán Biró, Zalaegerszeg; Sándor Doleschall; Éva Farkas, both of Budapest; Gyula Milley, Nagykanizsa; Tibor Paál, Nagykanizsa; Antal Szittár, Zalaegerszeg; György Tiszai; Gëza Udvardi, both of Nagykanizsa; József Páay, Budapest, all of Hungary

[73] Assignee: Magyar Szenhidrogenipari Kutato-Fejleszto Intezet, Szazhalombatta, Hungary

[21] Appl. No.: 94,014

[22] Filed: Sep. 4, 1987

Related U.S. Application Data

[63] Continuation of Ser. No. 899,657, Aug. 25, 1986, abandoned.

[30] Foreign Application Priority Data

Aug. 29, 1985 [HU] Hungary .............................. 3260/85

[51] Int. Cl.$^4$ ...................... E21B 43/22; E21B 43/24
[52] U.S. Cl. .................................... 166/303; 166/273; 166/274; 166/272
[58] Field of Search ............... 166/273, 274, 275, 268, 166/305.1, 303, 292

[56] References Cited

U.S. PATENT DOCUMENTS

| | | | |
|---|---|---|---|
| 4,372,786 | 2/1983 | Reed et al. | 166/292 X |
| 4,453,597 | 6/1984 | Brown et al. | 166/303 |
| 4,480,696 | 11/1984 | Almond et al. | 166/308 |
| 4,502,538 | 3/1958 | Wellington et al. | 166/274 X |
| 4,624,314 | 11/1986 | Clark | 166/273 X |

Primary Examiner—Stephen J. Novosad
Attorney, Agent, or Firm—Schweitzer & Cornman

[57] ABSTRACT

There is provided a process for the enhanced recovery of oil from oil bearing strata with gaseous or liquid form of carbon dioxide, the improvement which comprises prior to or simultaneously with the injection of carbon dioxide, injecting into the strata in a single slug or in a plurality of slugs a material consisting essentially of at least one compound which has a clay-effect inhibiting cation with a hydrated ion diameter of from about 0.136 to about 0.15 nm and a coordination number of 12, in a concentration number of 12, in a concentration of from about 0.001 mol to about 50 mol.

4 Claims, No Drawings

ENHANCED OIL RECOVERY

This is a File Wrapper Continuation of application Ser. No. 899,657, filed Aug. 25, 1986, now abandoned.

FIELD OF THE INVENTION

The invention relates to a method for the improved secondary and tertiary exploitation oil by using carbon dioxide, in particular in storing rocks containing sand, sandstone and marlaceous sandstone.

BACKGROUND OF THE INVENTION

It is a well known fact that processes based on the use of carbon dioxide occupy a preferred place among the secondary and tertiary methods of mineral oil exploitation, particularly in Hungary. For several reasons these inexpensive and promising methods have not yet reached the level of efficiency which was expected from them. A very important reason is one to which heretofore neither researchers nor designers paid sufficient attention. A special branch of clay mineral colloid chemistry deals with ion exchange processes that take place in clay minerals, tending to swell and having a layer structure of 2:1. If in these clay structures Ca and Mg cations are replaced by monovalent cations, contraction and swelling phenomena take place which considerably change outer and inner surface properties, sorption and stability.

These scientific observations were recognized and accepted by producing branches working under relatively static rock conditions, such as in the case of deep-drilling. However, no active correlation was established between reservoir-mechanism based on the occurrence of hydrodynamic processes in porous systems under dynamic circumstances, and the connected physical and chemical observations. For this reason the damaging role of clay minerals, in particular of clay minerals capable of swelling in the storing rocks, has not been sufficiently examined, although these phenoemena occur nearly in all cases in which liquid is injected and especially when water, aqueous solutions, liquids with acidic character or liquids tending to losing protons are injected. One of the reasons for the low efficiency of these processes when using carbon dioxide is in that clay minerals in the storing rocks become unbalanced during injection. This exerts a considerable effect on the hydrodynamic properties, sorption and stability of the storing rocks.

When in secondary and tertiary oil exploitation carbon dioxide is injected into the strata, in addition to multiphase liquid flow also interactions arise between rock and the liquid which are damaging the rocks. The rock-dissolving effect of carbon dioxide is mentioned, but no attention was paid to the damage caused by the clay minerals due to built-in $H^+$ ions.

It is also well known that clay minerals do not only perform rock-formation but they are cementing the rocks as natural consolidating materials. That means that built-in $H^+$-ions thicken the hydrate layer. This leads to swelling and dispersion, not only of clay minerals but of the entire storing rock cemented by the clay minerals is dispersed, resulting in phenomena such as clogging of production wells with sand, and continuous injectivity loss of injection wells.

In addition to the effect of the injected carbon dioxide causing dissolution of carbonates, also rock dispersion of significant extent occurs. During carbonate dissolution detrimental cations such as $Na^+$ get into the aqueous phase returned into the clay structure and cause considerable swelling and dispersion. Since carbon dioxide injection lasts for a longer period, and this is followed by injection of water, and since in these waters calcium and magnesium are substituted by sodium, it becomes clear that a continuous dispersing process takes place. Since this helps the natural system, considerable channel formation takes place, injected water and later the aqueous phase is running quickly through the storing rock and as a result flooding efficiency will be low.

DESCRIPTION OF THE INVENTION

An object of the invention is to eliminate the aforesaid deficiencies, thus to develop an improved method for mineral oil exploitation by the use of carbon dioxide. The object is particularly to accomplish this in stabilized storing rocks containing sand, sandstone and marlaceous sandstone which results in a far better efficiency than was possible in accordance with the prior art. The task set for the invention is to stabilize hydrodynamic characteristics of the storing rock.

In accordance with the invention, prior to or in course of injecting carbon dioxide gas or liquid carbon dioxide and/or the mixture of carbon dioxide and other gaseous media and/or the aqueous solution of carbon dioxide, continuously, clay effect inhibiting cations are injected in one slug or discontinuously in several slugs, said cations having a hydrated ion diameter of 0.13 to 0.15 nm and a coordination number 12. These cations being preferably potassium-, and/or ammonium-, and/or zirconium ions, are injected alternatively discontinuously or cyclically, in several smaller slugs with carbon dioxide, and/or mixture of carbon dioxide and other gaseous media, with aqueous solution of carbon dioxide into the storing rock, by repeating inhibiting slug/carbon dixide cycles more than once.

Further to increase productivity it is proposed not to introduce the clay effect inhibiting cations, preferably potassium-, and/or ammonium-, and/or zirconium ions, at a constant concentration, but to inject them in continuously or gradually increasing and/or decreasing concentrations, continuously in one slug or in a plurality of smaller slugs, discontinuously or cylically, while concentrations are to be adjusted so, to lie between at least 0.001 and 40.00 mol.

The clay effect inhibiting cations are suitably introduced into the storing rock in water-steam, in the mixture of water-steam and/or the vapor of organic compounds and/or organic solvents and/or in the mixture of water and organic solvent(s).

Clay minerals can be stabilized by using the method according to the invention, so that prior to, or while injecting carbon dioxide, prior to, or during periods of water injecting cations being suitable for inhibiting clay effect, preferably potassium, and/or ammonium-, and/or zirconium ions are introduced into the storing rock. Said inhibiting cations are built in more strongly into clay minerals, than calcium and magnesium ions, due to their advantageous hydrated ion-diameter (0.13 to 0.15 nm) and high number of coordination (12). As a consequence, clays capable of swelling are compacted, danger of dispersion is reduced, sorption capacity and heterogeneity become lower and hydrodynamic characteristics of the storing rocks are stabilized, such as permeability or injectivity of the injection wells.

If changes of the clay minerals in the storing rock can endanger the efficiency of intervention, then the process according to the invention can be suitably used prior to or during every productive operation based on injection of carbon dioxide, in form of a treatment on one or more occasions.

Cations for the purpose of inhibition are used in form of potassium, ammonium-, or zirconium compounds in the form of their water soluble salts or bases. The compounds can be transferred into the steam phase. Treating concentrations are between 0.001 to 50 mol, preferably 0.001 to 30.0 mol. The mixture of inhibiting ions can be successfully applied, in which the composition, proportion of ions, common concentration and partial concentration are to be adjusted to the particular features of the rock. It is considered as advantageous to keep the proportion of potassium : ammonium within the range 0.01–500, the proportion potassium : zirconium to 0.01 to 300, and potassium+ammonium : zirconium between 0.01 to 300. The liquid volume to be applied during treatment, such as that injected should amount to 0.001–0.7, suitably 0.01–0.5 pore volume of the storing rock.

We claim:

1. A process for the enhanced recovery of oil from oil bearing strata with gaseous or liquid form of carbon dioxide, the improvement which comprises prior to or simultaneously with the injection of carbon dioxide, injecting into the strata in a single slug or in a plurality of slugs a material consisting essentially of at least one compound which has a clay-effect inhibiting cation with a hydrated ion diameter of from about 0.136 to about 0.15 nm and a coordination number of 12, in a concentration of from about 0.001 mol to about 50 mol.

2. The improvement of claim 1, wherein said concentration is from about 0.001 mol to about 40 mol.

3. The process of claim 2, wherein said cation is at least one of potassium, ammonium, and zirconium.

4. The process of claim 2, wherein said concentration is varied during injecting.

5. The process of claim 1, wherein said compound is injected together with steam or with the vapor of an organic compound, or with a mixture of steam and vapor of an organic compound.

* * * * *